(12) United States Patent
Chang

(10) Patent No.: US 8,884,600 B2
(45) Date of Patent: Nov. 11, 2014

(54) AVERAGE INDUCTOR CURRENT CONTROL USING VARIABLE REFERENCE VOLTAGE

(75) Inventor: Yung-I Chang, Taipei (TW)

(73) Assignee: Alpha & Omega Semiconductor, Inc., Sunnyvale, CA (US)

( * ) Notice: Subject to any disclaimer, the term of this patent is extended or adjusted under 35 U.S.C. 154(b) by 417 days.

(21) Appl. No.: 13/324,121

(22) Filed: Dec. 13, 2011

(65) Prior Publication Data

US 2013/0069609 A1    Mar. 21, 2013

(30) Foreign Application Priority Data

Sep. 20, 2011    (CN) .......................... 2011 1 0279331

(51) Int. Cl.
*H02M 3/156*    (2006.01)
*G05F 1/46*    (2006.01)
*H02M 1/00*    (2006.01)

(52) U.S. Cl.
CPC ................ *G05F 1/46* (2013.01); *H02M 3/156* (2013.01); *H02M 2001/0025* (2013.01)
USPC ......................................... 323/313; 323/282

(58) Field of Classification Search
CPC .............. H02M 3/156; H02M 3/1588; H02M 2001/0025

USPC ......... 323/222, 223, 282, 284, 285, 311, 312, 323/313, 315, 317
See application file for complete search history.

(56) References Cited

U.S. PATENT DOCUMENTS

| | | | | |
|---|---|---|---|---|
| 5,572,416 A | * | 11/1996 | Jacobs et al. | ..................... 363/89 |
| 2006/0176036 A1 | | 8/2006 | Flatness et al. | |
| 2008/0192514 A1 | | 8/2008 | Zhou et al. | |
| 2012/0081094 A1 | * | 4/2012 | Luo et al. | ...................... 323/284 |

* cited by examiner

*Primary Examiner* — Gary L Laxton
*Assistant Examiner* — Kyle J Moody
(74) *Attorney, Agent, or Firm* — Chein-Hwa Tsao; CH Emily LLC

(57) ABSTRACT

A variable reference voltage generation unit used in DC/DC converter includes a sample-hold valley inductor current unit electrically connected to a reference voltage generation unit. The sample-hold valley inductor current unit receives the valley inductor current and converts it into the valley voltage. The reference voltage generation unit receives and converts a current signal two times of a designated current into a voltage signal two times of a designated voltage. The voltage signal two times of reference voltage is then subtracted by the valley voltage to produce the new reference voltage to compare with an inductor voltage for controlling the switching of a switching transistor of the DC/DC convertor.

17 Claims, 5 Drawing Sheets

AVERAGE INDUCTOR CURRENT CONTROL USING VARIABLE REFERENCE VOLTAGE

PRIORITY CLAIM

This application claims the priority benefit of Chinese patent application number 201110279331.X filed Sep. 20, 2011, the entire disclosures of which are incorporated herein by reference.

FIELD OF THE INVENTION

This invention relates to an average inductor current mode voltage control method used in a DC/DC converter, especially to an average inductor current mode voltage control method of the constant off-time DC/DC converter using a variable reference voltage generation unit.

BACKGROUND OF THE INVENTION

The input voltage, in a single phase alternating-current (AC) electrical outlet, of daily used electrical appliances or electronic equipments in various industries is in the range of 100V to 240V. However, load of each electronic product or device is not the same and the required driving voltage is also different, thus a voltage converter is needed to adjust the power supplies for a variety of applications.

There are different kinds of voltage converter, for example AC/AC converter, AC/DC converter, DC/DC converter and DC/AC converter. In many electronic circuits, some electronic devices require two or more power supplies, for example LCD monitors, voltage comparators, operational amplifiers and the likes, or different operating voltages, thus the DC/DC converter is needed to obtain the desired voltages.

FIG. 1 is a circuit diagram of the existing step-down DC/DC converter, or buck converter, including two switches (a transistor and a diode), an inductor and a capacitor. As shown in FIG. 1, when the transistor switch S is on, current from the input power supply (Vin) flows cross the inductor L, and thus energy is stored in the inductor L. When the transistor switch S is off, the inductor current stored in the inductor L is released to resistor R to maintain the output voltage (VO). The output voltage (VO) converted from the inductor current is then fed back through the feedback circuit 10 to the control circuit 12 for comparing with a reference voltage to control the duty cycle of transistor switch S for achieving a stable output voltage. Refer to FIG. 1, when the transistor switch S is on, one end of the inductor L is connected to the input voltage Vin, and the other end is connected to the output voltage VO. The input voltage must be higher than the output voltage to form a positive direction voltage drop cross the inductor L. When the transistor switch S is off, one end of the input voltage Vin, which is originally connected to the inductor L, is connected to ground GND, thus the output voltage VO is the positive end, forming a negative direction voltage drop cross the inductor L.

In the above configuration, the peak inductor current produced under peak current mode is used to compare with the constant reference voltage to control the transistor switch, which produces a peak-to-average error and therefore produces poor regulation accuracy. As shown in FIG. 2 (a), bigger inductance L creates higher average inductor current, thus the peak-to-average error is relatively smaller; otherwise, as shown in FIG. 2 (b), smaller inductance L creates lower average inductance current, the peak-to-average error is relatively larger. The average inductor current strongly depends on the inductance, resulting in very poor voltage regulation accuracy of the converter.

For this reason, this invention proposes an average inductor current-mode voltage control method using a variable reference voltage and a variable reference voltage generation unit. In the present invention method, the average current's loop compensation or load current sense is adjusted by the inductor current only, and the average inductor current is used to control the constant off time DC/DC converter operating in continuous conduction mode.

SUMMARY OF THE INVENTION

This invention provides an average inductor current mode voltage control method for the DC/DC converter using a variable reference voltage. The reference voltage is varied depending on the valley inductor current and is adjusted in accordance with the average inductor current dynamically. The method of the present invention regulates the valley current, instead of the peak current of the existing technology, and is independent on the inductance value.

This invention provides an average inductor current mode voltage control method and a variable reference voltage generation unit, in which the average inductor current is used to control the constant off-time DC/DC converter operating in continuous conduction mode, which is not directly influenced by inductor used in the converter, and further improving the voltage regulation accuracy.

The average inductor current mode voltage control method proposed in this invention can be applied for a DC/DC converter. At first, a current signal two times of a designated current is received and converted into a voltage signal two times of a designated voltage. Then, a valley inductor current produced by an inductor of the converter is converted into a valley voltage. The valley voltage is subtracted from the voltage signal two times of the designated voltage to produce a new reference voltage that is the basis for controlling the switching of the transistor switch in the converter. The new reference voltage is then compared with an inductor voltage produced by the inductor, producing a compared result such that when the new reference voltage and inductor voltage are equal, the compared result is a cut-off signal that turn off the transistor switch.

This invention also proposes a variable reference voltage generation unit used in DC/DC converter, which includes a sample-hold valley inductor current unit electrically connected to a reference voltage generation unit. The sample-hold valley inductor current unit receives the valley inductor current and converts it into the valley voltage. The reference voltage generation unit receives and converts the current signal two times of the designated current into the voltage signal two times of the designated voltage. The voltage signal two times of designated voltage is then subtracted by the valley voltage to produce the new reference voltage.

Specific embodiments will be described as follows with attached drawings for better understanding of the purpose, technical contents and characteristics as well as achieved effects of this invention.

DETAILED DESCRIPTION OF THE EMBODIMENTS

In the method of the present invention, a variable reference voltage is created, which is varied depending on the valley inductor current. Since the inductor ripple current is half of the sum of valley inductor current and peak inductor current, which means that the peak inductor current equals to two times of average inductor current subtracting the valley inductor current. Therefore, the new reference current Iref can be defined as two times of the designed average inductor current Iavg subtracting the valley inductor current Ivalley, as shown in the following equation (1):

$$Iref = 2*Iavg - Ivalley \quad (1)$$

When expressed in voltage, it indicates that reference voltage Vref can be set as two times of the designed average inductor voltage Vavg subtracting valley inductor voltage Vvalley, which is shown as the following equation (2):

$$Vref = 2*Vavg - Vvalley \quad (2)$$

Based on the above equation, this invention proposes an average inductor current mode voltage control method and the variable reference voltage generation unit. The average inductor current mode voltage control method proposed in this invention is for DC/DC converter, for example for the constant off-time DC/DC converter.

Figure 1:
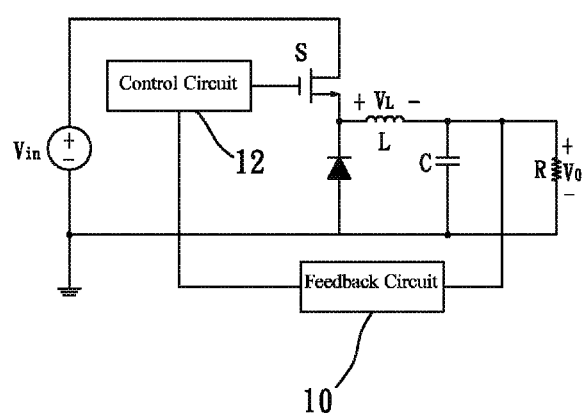
FIG. 1 is a circuit diagram of the existing step-down DC/DC converter.
Figure 2:
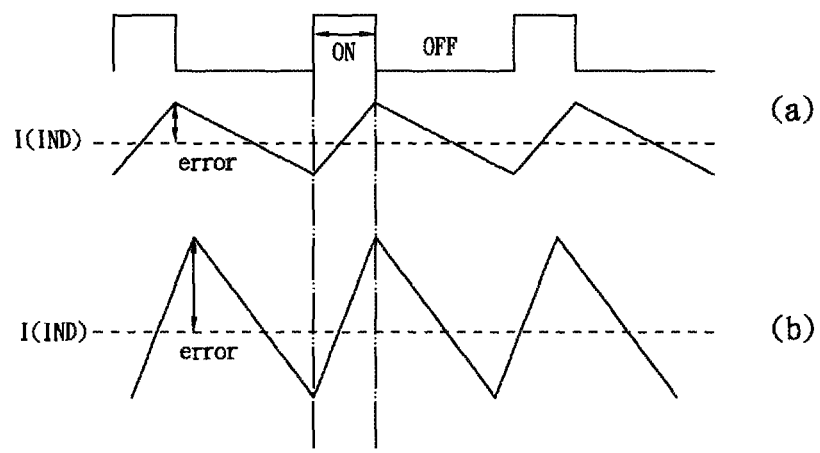
FIG. 2 are waveform diagrams of the existing inductor current, in which graph (a) shows a waveform when inductance L is larger and graph (b) shows a waveform when inductance L is smaller.
Figure 3:
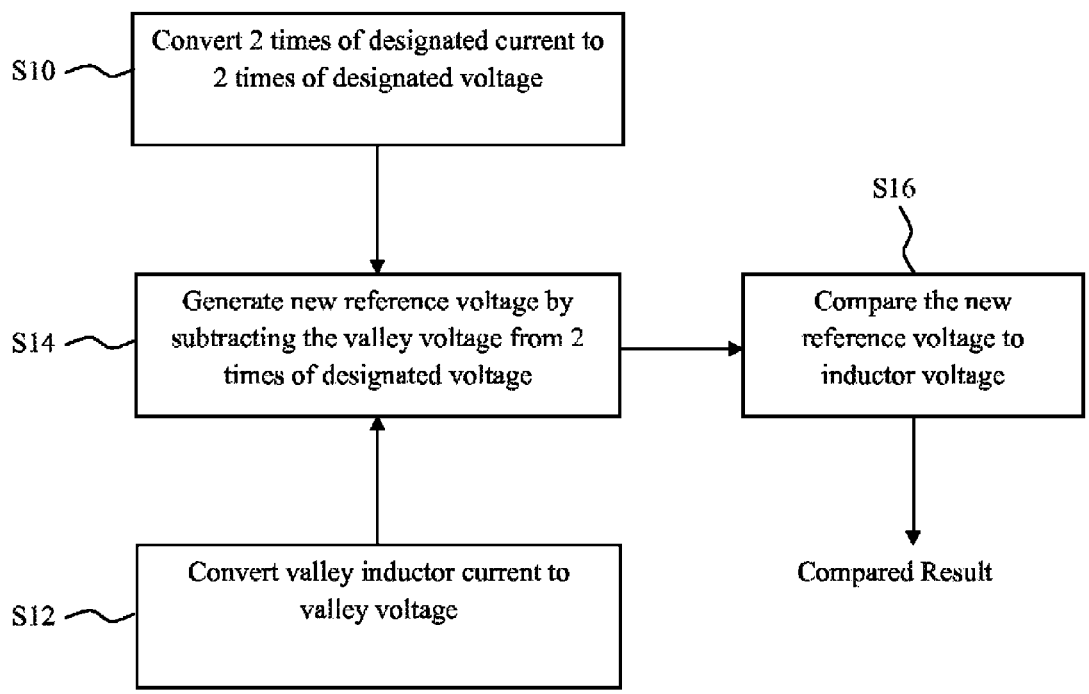
FIG. 3 is flow diagram of the voltage control method in this invention.

Refer to FIG. 3, as shown in step S10, a current signal two times of the designated average inductor current, is converted into a voltage signal two times of the designated average inductor voltage. As shown in step S12, the valley inductor current produced by an inductor in the DC/DC converter is also converted into a valley voltage. Then, as shown in step S14, a new reference voltage is generated by subtracting the valley voltage from the voltage signal two times of the designated average inductor voltage, as shown in the above equation (2), which is the basis for control the switching of the transistor switch in the DC/DC converter.

After the new reference voltage being obtained, as shown in step S16, the new reference voltage (Vref) is compared with the inductor voltage (CS) produced by the inductor, thus the compared result is sent to control the switching of the transistor switch in the DC/DC converter. When the inductor voltage and the new reference voltage are equal, it means that the compared result is a cut-off signal that turn off the transistor switch (OFF). As a result, the average inductor current can be stabilized at a designed value. Conversely, when the new reference voltage and the inductor voltage are not equal, it means that the compared result is an ON-state signal that keeps the transistor switch on.

Furthermore, the above-mentioned voltage signal two times of the designed average voltage, the valley voltage and the new reference voltage are all generated from a variable reference voltage generation unit, which is described in detail as follows.

Figure 4:
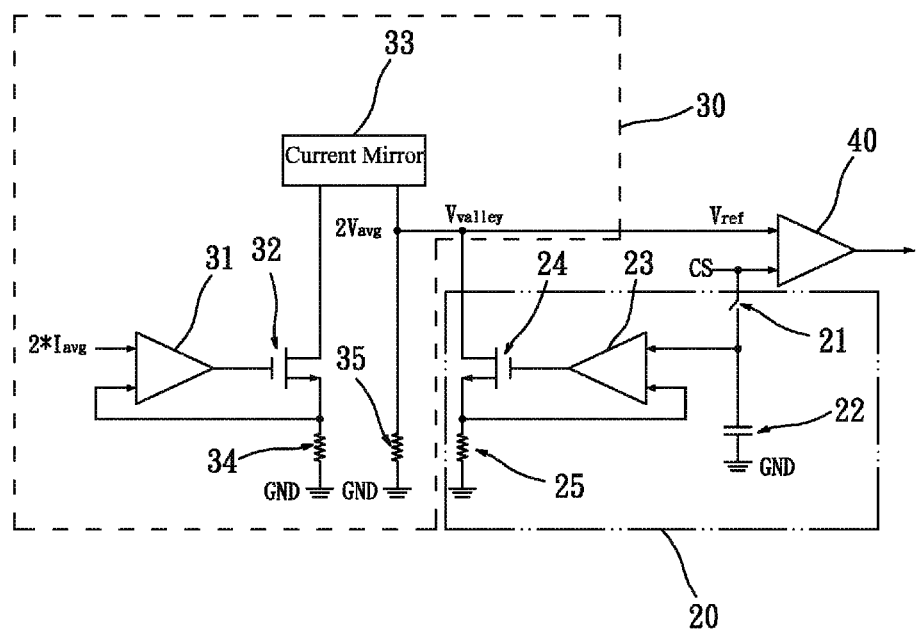
FIG. 4 is circuit diagram of the variable reference voltage generation unit in this invention.

As shown in FIG. 4, a variable reference voltage generation unit mainly includes a sample-hold valley inductor current unit 20 and a reference voltage generation unit 30. The sample-hold valley inductor current unit 20 receives the valley inductor current (CS) produced in an inductor and converts it into a valley voltage (Vvalley), which is then sent to the reference voltage generation unit 30 that is electrically connected to the sample-hold valley inductor current unit 20. The reference voltage generation unit 30 receives and then converts the current signal two times of the designated average inductor current (2Iavg) into the voltage signal two times of the designated voltage (2Vavg). New reference voltage (Vref) is generated by subtracting the valley voltage from the voltage signal two times designated voltage (i.e., 2Vavg−Vvalley). The generated reference voltage (i.e., the new reference voltage) is compared with the inductor voltage (CS) produced by the inductor in the converter by a comparator 40 producing a compared result. When the new reference voltage and the inductor voltage are equal, comparator 40 gives a cut-off signal that control the transistor switch within DC/DC converter in OFF-state, and consequently, if the new reference voltage and the inductor voltage are not equal, then the comparator 40 does not give the cut-off signal, which is also known as ON-state signal, which keeps the transistor remained at ON state.

As shown in FIG. 4, the sample-hold valley inductor current unit 20 includes a switch 21 connected to a capacitor 22 and an operational amplifier 23, a transistor switch 24 including a gate connected to the output end of the operational amplifier 23, a source connected to a resistor 25 and a drain connected to the reference voltage generation unit 30. When switch 21 is turned on, the valley inductor current (CS) flows cross the switch 21, the operational amplifier 23 and the transistor switch 24, which is then converted into valley voltage (Vvalley) by the resistor 25 and is sent to the reference voltage generation unit 30.

The reference voltage generation unit 30 includes an operational amplifier 31 that receives the current signal two times of a designated average current (2Iavg), a transistor switch 32 having a gate connected to the output of the operational amplifier 31, a source connected to a current mirror 33 and a drain connected to a first resistor 34. The current mirror 33 is also connected to a second resistor 35 and to the sample-hold valley inductor current unit 20 at a joint between the current mirror 33 and resistor 35. The voltage signal two times of designated average current (2Iavg) is converted into a voltage signal two times of the average voltage (2Vavg) and is subtracted by the valley voltage (Vvalley) sent from the sample hold valley inductor current unit 20 generating the new reference voltage (Vref) (i.e., Vref=2Vavg−Vvalley). The output reference voltage (Vref) is sent to the comparator 40 for a comparison with the inductor voltage. Transistor switches 24 and 32 are preferably thin-film transistors (TFT).

Figure 5:
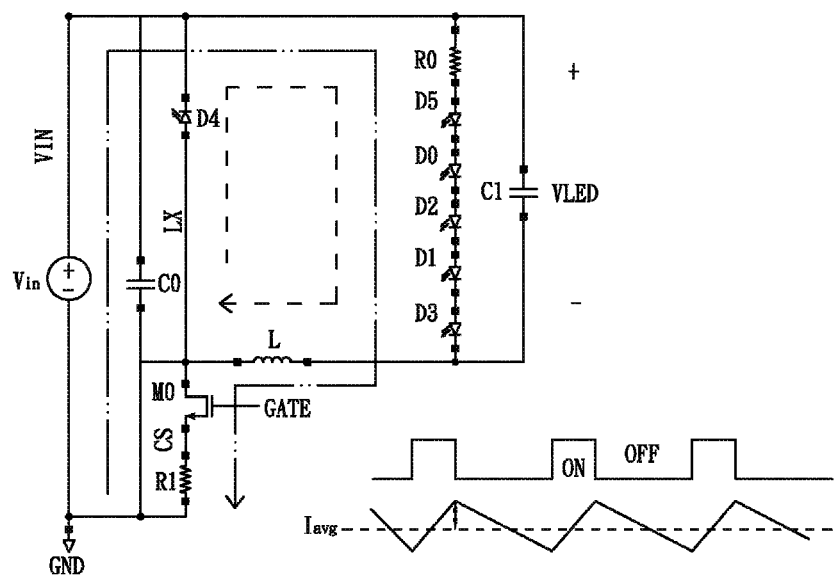
FIG. 5 is circuit diagram of a circuit applying the variable reference voltage generation unit of the type described in FIG. 4.

When the variable reference voltage generation unit described in FIG. 4 is used in actual circuit, as shown in FIG. 5, with the transistor switch MO being at ON state, current from the input power supply Vin flows cross the inductor L and the energy is stored in the inductor. After the cut-off signal being sent to the transistor switch MO, the transistor switch MO turns off (OFF), and the inductor current on inductor L is released to the resistor R1 to stabilize the voltage output.

This invention provides an average inductor current mode voltage control method used in a DC/DC converter using the variable reference voltage generation unit, especially in the constant off time DC/DC converter. The reference voltage is varied depending on the valley inductor current of the inductor current ripple. As a result, the reference voltage can be adjusted in accordance to the average inductor current dynamically. The method of the present invention regulates the average inductor current, instead of the peak current in the existing technology, and is independent on the inductance value. Furthermore, in this invention, the average inductor current is used as the basis of the reference voltage and is used to control the constant off time DC/DC converter operating in continuous conduction mode, so it will not be directly influenced by inductor in the converter, which effectively improves the voltage regulation accuracy.

The above-mentioned content is illustrative but not restrictive. It is known to the ordinary technical personnel in this field that, all modifications, changes, or the equivalent within the spirit and scope subject to the following attached claims for this invention are bound to be protected.

The invention claimed is:

1. An average inductor current mode voltage control method for a DC/DC converter comprising the following steps:
   receiving a current signal two times of a designated current and converting the current signal into a voltage signal two times of a designated voltage;
   converting a valley inductor current produced by an inductor in the DC/DC converter into a valley voltage; and
   subtracting the valley voltage from the voltage signal two times of the designated voltage to generate a reference voltage that controls switching of a transistor switch in the DC/DC converter.

2. The average inductor current mode voltage control method of claim 1, further comprising a step of comparing the reference voltage to an inductor voltage produced by the inductor in the DC/DC converter yielding a compared result.

3. The average inductor current mode voltage control method of claim 2, wherein when the reference voltage and the inductor voltage are equal, the compared result is a cut-off signal that turns off the transistor switch.

4. The average inductor current mode voltage control method of claim 2, wherein when the reference voltage and the inductor voltage are not equal, the compared result is an on-state signal that keeps the transistor switch on.

5. The average inductor current mode voltage control method of claim 1, wherein the designated current is an average inductor current of the inductor in the DC/DC converter and the designated voltage is an average inductor voltage of the inductor.

6. The average inductor current mode voltage control method of claim 1, wherein the DC/DC converter is a constant off-time DC/DC converter.

7. The average inductor current mode voltage control method of claim 1, wherein the designated voltage, the valley voltage and the new reference voltage are generated from a variable reference voltage generation unit.

8. A variable reference voltage generation unit in a DC-DC converter comprising:
   a sample-hold valley inductor current unit receiving a valley inductor current produced from an inductor and converting the valley inductor current into a valley voltage; and
   a reference voltage generation unit, electrically connected to the sample-hold valley inductor current unit, receiving a current signal two times of a designated current and then converting the current signal two times of the designated current into a voltage signal two times of a designated voltage
   wherein a reference voltage is generated by subtracting the valley voltage from the voltage signal two times of the designated voltage.

9. The variable reference voltage generation unit of claim 8, further comprising a comparator comparing the reference voltage with an inductor voltage produced by the inductor.

10. The variable reference voltage generation unit of claim 9, wherein when the reference voltage equals to the inductor voltage, the comparator provides a cut-off signal that turns off a transistor switch of the DC/DC converter.

11. The variable reference voltage generation unit of claim 9, wherein when the reference voltage is not equal to the inductor voltage, the comparator provides an on-state signal that keeps a transistor switch of the DC/DC converter on.

12. The variable reference voltage generation unit of claim 8, wherein the designated current is an average inductor current of the inductor.

13. The variable reference voltage generation unit of claim 8, wherein the DC/DC converter is a constant off-time DC/DC converter.

14. The variable reference voltage generation unit of claim 8, wherein the sample-hold valley inductor current unit comprises a switch connected to an operational amplifier and a capacitor, and a transistor switch having a gate connected to an output end of the operational amplifier, a source connected to a resistor and a drain connected to the reference voltage generation unit respectively.

15. The variable reference voltage generation unit of claim 14, wherein the transistor switch is a thin film transistor (TFT).

16. The variable reference voltage generation unit of claim 8, wherein the reference voltage generation unit comprises an operational amplifier for receiving the current signal two times of the designated current, a transistor switch having a gate connected to an output end of the operational amplifier, a source connected to a first resistor and a drain connected to a current mirror, wherein the current mirror is connected to a second resistor and to the sample-hold valley inductor current unit at a joint between the current mirror and the second resistor, wherein the reference voltage is generated by subtracting the valley voltage generated from the sample-hold valley inductor current unit from the voltage signal two times of the designed voltage.

17. The variable reference voltage generation unit of claim 16, wherein the transistor switch is a thin film transistor (TFT).

* * * * *